US007210919B2

(12) United States Patent

Senosiain

(10) Patent No.: US 7,210,919 B2

(45) Date of Patent: May 1, 2007

(54) INSTALLATION FOR PRODUCING REINFORCED CONCRETE PARTS

(75) Inventor: Virgilio Echauri Senosiain, Navarra (ES)

(73) Assignee: Associated Property Investments, LLC, Wilmington, DE (US)

( * ) Notice: Subject to any disclaimer, the term of this patent is extended or adjusted under 35 U.S.C. 154(b) by 400 days.

(21) Appl. No.: 10/495,470

(22) PCT Filed: Nov. 7, 2002

(86) PCT No.: PCT/SE02/00517

§ 371 (c)(1), (2), (4) Date: Sep. 23, 2004

(87) PCT Pub. No.: WO03/041928

PCT Pub. Date: May 22, 2003

(65) Prior Publication Data

US 2005/0214401 A1 Sep. 29, 2005

(30) Foreign Application Priority Data

Nov. 16, 2001 (ES) .................................... 0102539
Apr. 8, 2002 (ES) .................................... 0200798
Oct. 17, 2002 (ES) .................................... 0202382

(51) Int. Cl.

*B28B 5/02* (2006.01)
*B29C 39/06* (2006.01)
*B29C 39/16* (2006.01)

(52) U.S. Cl. ...................... 425/169; 425/171; 425/230; 425/371; 425/453

(58) Field of Classification Search ................ 425/169, 425/171–173, 364 R, 371, 225, 230, 433, 425/453, 470–471

See application file for complete search history.

(56) References Cited

U.S. PATENT DOCUMENTS

| | | | | |
|---|---|---|---|---|
| 1,998,117 | A | 4/1935 | Brush | |
| 3,724,988 | A | 4/1973 | Gouws | |
| 4,375,350 | A * | 3/1983 | Sato | 425/371 |
| 4,514,162 | A * | 4/1985 | Schulz | 425/371 |

FOREIGN PATENT DOCUMENTS

| | | |
|---|---|---|
| WO | WO 88/10185 | 12/1988 |
| WO | WO 94/13447 | 6/1994 |
| WO | WO 96/26055 | 8/1996 |

* cited by examiner

*Primary Examiner*—Yogendra R. Gupta
*Assistant Examiner*—Thu Khanh T Nguyen
(74) *Attorney, Agent, or Firm*—Dennis G. LaPointe

(57) ABSTRACT

Installation to produce reinforced concrete parts, including a first conveyor (1) on which the model of the parts to be produced is carried out, a second conveyor (2) for the part drying and an outlet (3) to withdraw the formed parts, being formed the first conveyor (1) of a metal sheet band, on which a marking pencil (12) carries out the drawing to determine the forms of the parts, forming the cases of the mentioned forms respect to some continuous side bands (11) which are situated on the metal belt (1) in combined movement with it.

13 Claims, 17 Drawing Sheets

INSTALLATION FOR PRODUCING REINFORCED CONCRETE PARTS

The present invention refers to an installation to carry out prefabricated reinforced concrete parts such as panels, posts, beams, etc . . . , intended for their use as assembly blocks in construction.

In the building works prefabricated parts such as bricks, plates, beam lengths, etc . . . are used, with which the construction to be carried out is built in each case, by means of the assembly and union of the corresponding prefabricated parts.

When speaking about reinforced concrete parts, the realization of the same is carried out in a conventional way on fabrication tables which establish hollows or cages according to the shape of the parts to be made, placing the concrete and the necessary reinforced structure in the mentioned cages, to strip the form of the part after the hardening of the concrete and take it out with a crane or similar means.

This production process is completely manual, which supposes a lot of hand work and slowness in production, moreover with the inconvenience that at the bottom of the concrete shapes to make the parts, normally residues of concrete remain, making cleaning necessary, which is difficult and also delays the process in prejudice of the production.

There are continuous production solutions, in which the moulds for the creation of the concrete parts are placed on a conveyor belt, passing through successive stations such as mould filling, compacting of the concrete and drying of the parts, until a final evacuation of the same.

In some solutions, as those of Patents SU 1222557 and FR 2565155, among others, independently built moulds are used, which are placed on the conveyor belt, which requires the prior construction of the moulds and their transport till the installation of application.

In the Spanish Patents 383.489, which has already expired, a solution is indicated in which the forms are made on the conveyor belt itself, including some adjustable limiting devices which provide for the side closure of the moulds. In this solution, the conveyor belt is made up of paths in the shape of a chain, which allows little effective control to avoid the side variations of the belt which makes up the base of the forms, while the side limiting devices are independent, requiring a very complex individual regulation.

The problem is solved in an advantageous way with the recommended installation, which allows an almost completely automatic production process, developing the abovementioned process in a continuous successive way, so that the parts that are produced are carried out consecutively without interruption.

This installation, being the object of the invention, is made up of three transports, situated consecutively one after the other, there being some concrete-discharging means moving in relation with the first transport, while in a longitudinal path this transport passes under some bands, adjustable in their width, which make up the side contention of the deposited concrete, establishing the mentioned bands as the shaping moulds of the parts in combination with transverse separating devices which are situated on the conveyor itself, according to the length of the parts to be produced.

The abovementioned first transport is made up of a sheet steel conveyor belt, creating a flat supporting surface for the shaping concrete of the parts to be produced, there being a stripping grease impregnating device moving in relation with that surface and an anti-setting lacquer-impregnating device, which are activated in a selective way in relation of the surface finish required in the produced parts.

On the initial part of that metal conveyor belt a marking pencil is situated which is activated automatically by a control programme, by means of which the location of the successive parts to be built is marked on the metal conveyor belt, for the installation of the necessary separating devices respect to the mentioned location.

With regard to the lower part of the metal conveyor belt, cleaning means are included, which perform the cleaning of the surface of the mentioned belt in a continuous way, eliminating completely the residues remaining on it after the production of the parts.

The abovementioned metal conveyor belt constitutes the first transport on which the parts to be produced are built, said parts remaining on the abovementioned first transport during the setting of the constructive concrete and in the first drying phase, while on the second transport the drying of the produced parts is completed, making the third transport a support of the parts; this support can be tilted sideways to a near-vertical position for the withdrawal of the parts by means of a crane.

In the drying stages of the parts, means are included which are selectively connectable by means of a programme to give the parts certain aspects, such as polishing or colouring, there being a water pressure projector situated between the drying part and the outlet of the parts; this projector can also be selectively operated by a programme to clean the lower face of the parts.

The entirety of the installation is situated beneath an arch, which establishes an area in which it is possible to determine an environment with programmed temperature and humidity to favour the hardening and drying of the concrete of the parts that are being produced.

According to a construction, at the outer part of the mould-building side bands, some supporting stops of the abovementioned bands are situated; these stops make up at each of the sides a set which is kept fixed to the metal band in the moulded formation path of the concrete parts, establishing a stop which impedes the relative movement of the corresponding side band to the outside.

The abovementioned supporting stops of the side bands are made up of a succession of magnets joined with springs in the shape of a chain, the aforementioned magnets being made up of some respective plates in fixed fastening on them, passing the succession of chains of the magnets in support on the metallic band along the upper path of the latter, to return along the lower part, independent from the same.

In this way the supporting stops of the side bands remain attached to the metallic band in the path of the formed shaping of the concrete parts, owing to the fastening which the magnets establish on the abovementioned metallic band, with which the movement of the abovementioned stops is synchronized with the metal band and with the side bands, and at the same time the position of the abovementioned stops is maintained fixed respect to the metal band in the formed shaping path of the concrete parts, establishing, by means of the plates which are fixed on the magnets, a stop which impedes the relative outward movement of the bands on the metal belt.

On the other hand, the side bands are situated in a continuous loop above the metal belt along the path of the mould-shaping of the concrete parts, returning on the lower part in support on some corresponding conveyor belts or rollers, passing the abovementioned belts in the upper path in a vertical sideways position to establish the closure of the forms that build the concrete parts, while in the lower return path they are placed in a horizontal position which favours the support on the conveyor belts or rollers and the corresponding haulage.

According to a feature of the invention, at the initial part of the moulding area a discharge head is situated and an adaptor head of the concrete in the part-shaping moulds, including the abovementioned heads in a transverse movement assembly with regard to the transport of the mould, in relation to the respective cleaning cabins of the same, situated to one side.

This way a disposition is obtained in which the abovementioned discharge heads and adaptation of the concrete in the forms can be of a smaller width than the moulding conveyor, covering the width of the latter by means of the transverse movement, which determines that the surface of the mentioned heads to be cleaned is smaller.

Owing to the smaller surface of the heads to be cleaned, a dry cleaner by means of a scraper is located in relation to them, which allows to carry out the installation job without having to move the heads to the corresponding cleaning cabins until after a certain time, with which a considerable water saving is reached, reducing the amount of polluted water resulting from the cleaning.

The metallic band is supported in the mould-transporting path on a supporting conveyor chain which duly allows to support the weight of the parts being shaped in the moulds, returning the band and the supporting chain independently by the lower part, supported on respective supporting roller sets, while the bands that determine the sides of the forms return in turn independently.

In the independent returning disposition of the movable elements, the metal band remains free of retentions and charges, establishing in relation with it a driving guiding which corrects the side deviations that the same can have.

The second installation conveyor, as well as the outlet areas to unload the parts, are foreseen, according to a particular execution, by means of a succession of supporting rollers for the transport of the concreted parts, with which it builds a resistant support which allows to support with a very simple assembly disposition the weight of the parts of application.

In the abovementioned performance, over the concrete part outlet area for the unloading thereof, a frame is located whose structure remains inserted in relation to the part supporting rollers, independent from the mentioned rollers, being the mentioned frame in tilting articulated assembly on a side, with activating means for the mentioned tilting; with which the tilting of the parts happens till the withdrawing position by lifting means, this is carried out by means of the accessory frame, while the movement rollers of the parts in that area remain fixed, resulting the installation assembly this way much simpler, as the tilting means and the part movement means are independent.

Between the second conveyor of the installation and the outlet area to unload the parts, the incorporation of a thermoretractile plastic laminar band is foreseen, transversely respect to the part movement route, so that when the parts pass towards the outlet area they remain wrapped up by the thermoretractile plastic sheet, which favours the conditions for the total setting of the concreted parts in a short time during in storage.

According to a particularity in the installation, a water re-circulating system is moreover foreseen which is used in the cleaning of the concreted parts, as well as the water used for the cleaning of the concreting elements, delivering this residual water to the concrete elaboration process to build the mentioned parts, with which the water consumption of the installation is reduced and at the same time the pouring of polluted water is eliminated.

This way a set is obtained which allows for the performance in very favourable conditions of the successive uninterrupted production of parts, reaching a high degree of production yield and an efficient quality of the parts that are produced.

Figure 1:
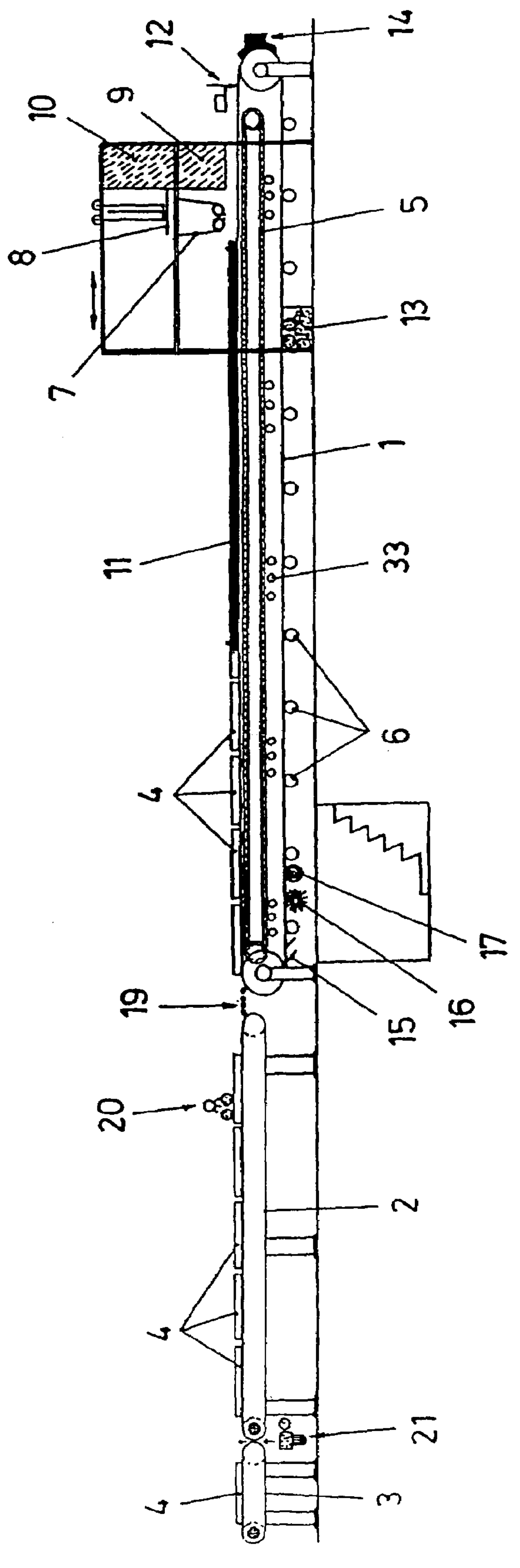
FIG. 1 shows a lifted side view of the described installation set, according to a schematic representation.

The object of the invention refers to an installation to produce reinforced concrete parts by means of a continuous process and almost completely automatic.

The installation includes three consecutive transports (1, 2 and 3) making up a longitudinal set on which the parts (4) to be produced are transported, till their total finish.

The first transport (1) is a steel sheet belt which extends along a long path, supported at the upper part on chains (5) which establish a continuous support accompanying the belt (1) while at the lower part the belt (1) and the chains (5) return supported on respective supports comprising supporting rollers (6 and 33).

The mentioned belt (1) passes initially through a concrete delivery area, where it is situated above, a head (7) capable of placing on the belt (1) amounts of concrete according to the parts (4) to be produced, another head (8) being situated in this area, to flatten and compact the placed concrete.

Both heads (7 and 8) are movable to carry out the function of the concreting of the parts (4) to be produced, on the band (1) being it possible to withdraw them till the respective cabins (9) and (10) for the cleaning with water under pressure, for their cleaning after each operation.

Figure 13:
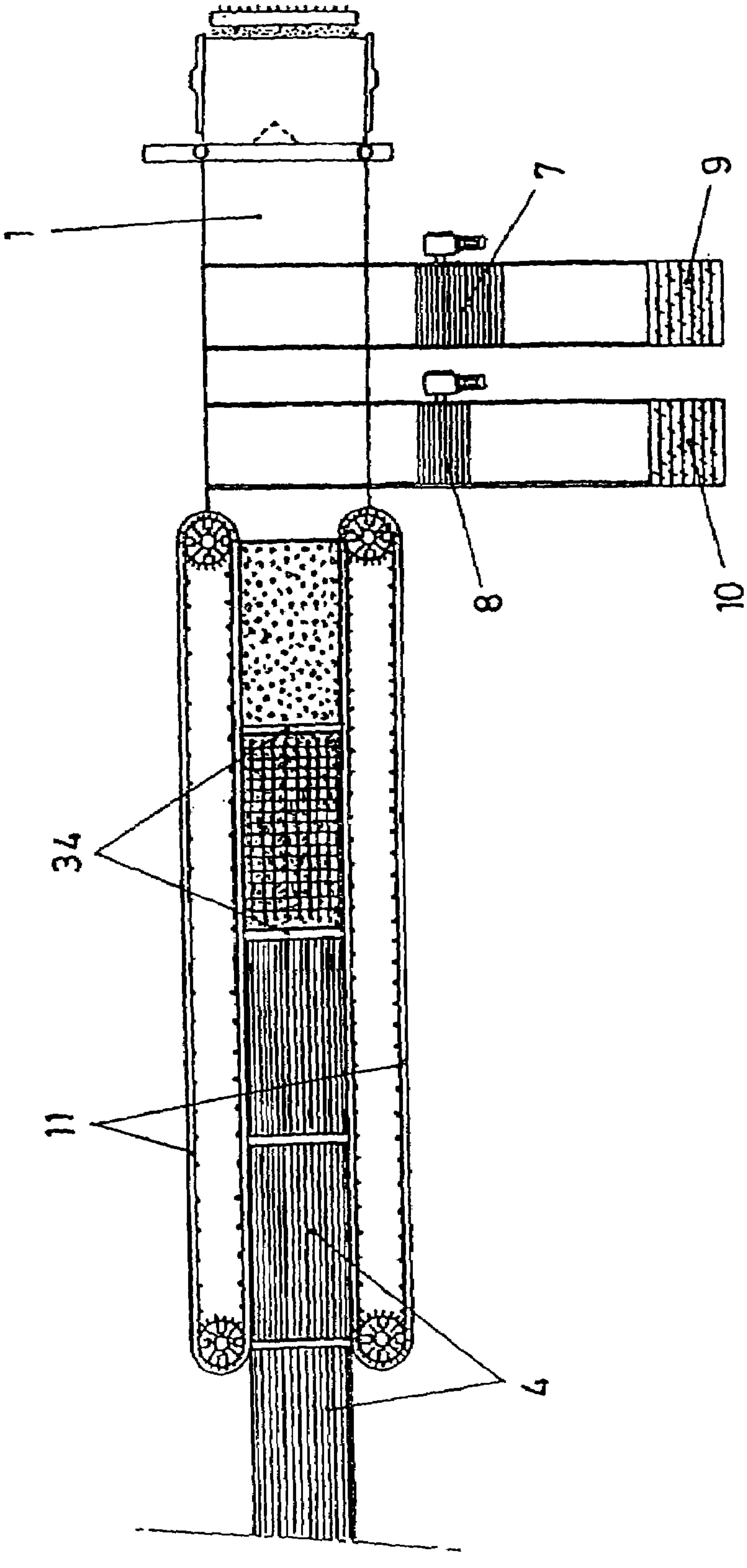
FIG. 13 shows a top view of the formed shaping part of the parts in the described installation, with the discharge heads and adaptation of the concrete in transverse movement assembly.
Figure 14:
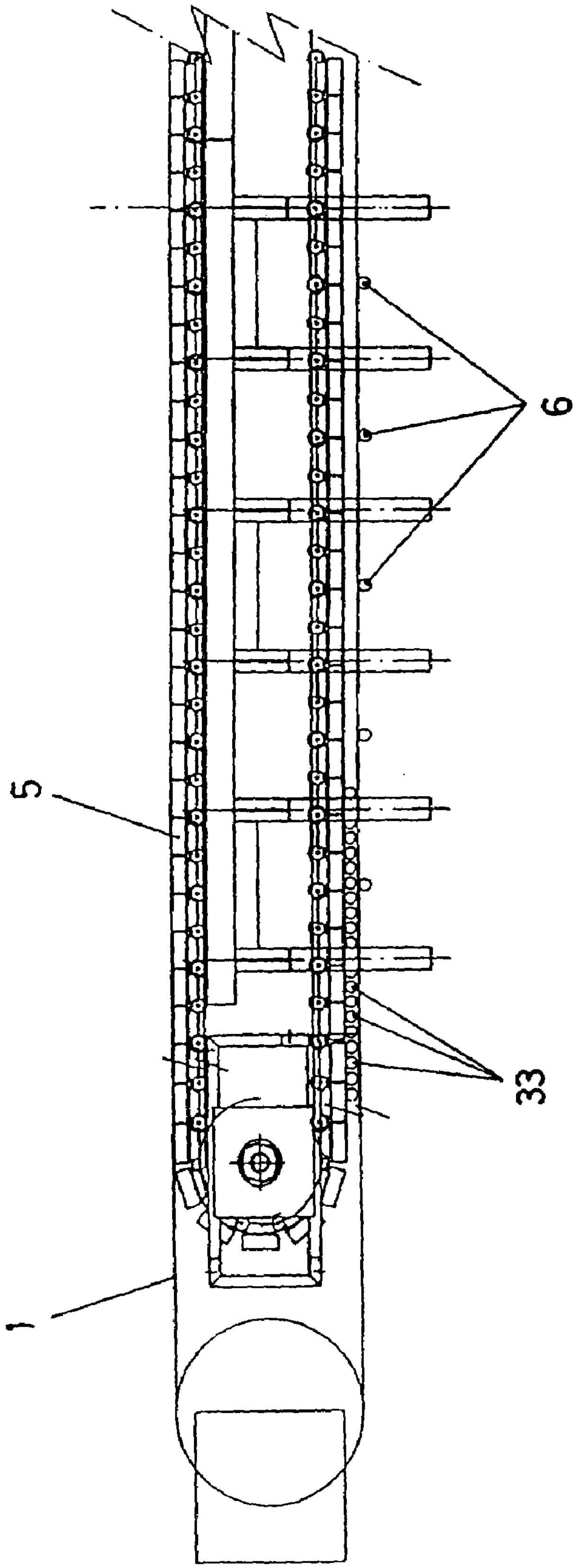
FIG. 14 is a side view of an extreme end part of the form conveyor of the parts in the installation.

According to a construction, as seen in FIG. 13, the mentioned heads (7 and 8) are situated in a transverse movement assembly respect to the transport for the moulding, in moving disposition till both respective cleaning cabins (9 and 10) situated at a side.

With this disposition the mentioned heads (7 and 8) can have a smaller width than the moulds built on the metal belt (1), as for the realization of the concreting, the mentioned heads (7 and 8) cover the width of the moulds by means of their transverse movement, which makes it possible to have some heads (7 and 8) with a very reduced operative surface.

This small dimension of the operative surface of the heads (7 and 8) makes that these can be cleaned easily, placing respect to them a dry cleaner with scraper, which allows the deep cleaning of the heads (7 and 8), by means of the cleaning, in the respective cabins (9 and 10), it should only be carried out every certain time, reaching this way a considerable water saving, at the same time as the production of polluted water residues is reduced considerably.

From the abovementioned constructive concreting area of the parts (4) to be produced, the belt (1) extends along a section beyond some bands (11) which accompany the belt movement (1) in that path, being the mentioned bands (11) situated vertically sideways, to hold sideways the constructive concrete of the parts (4).

The abovementioned side bands (11) are in synthetic material such as silicone or similar, structured on bearing chains, determining at the inner face a profiled configuration according to the shape of the sides of the part (4) to be produced. The abovementioned bands (11) can be adjusted in the width of their separation on the belt (1), which allows adjusting in turn the width of the parts (4).

Figure 9:
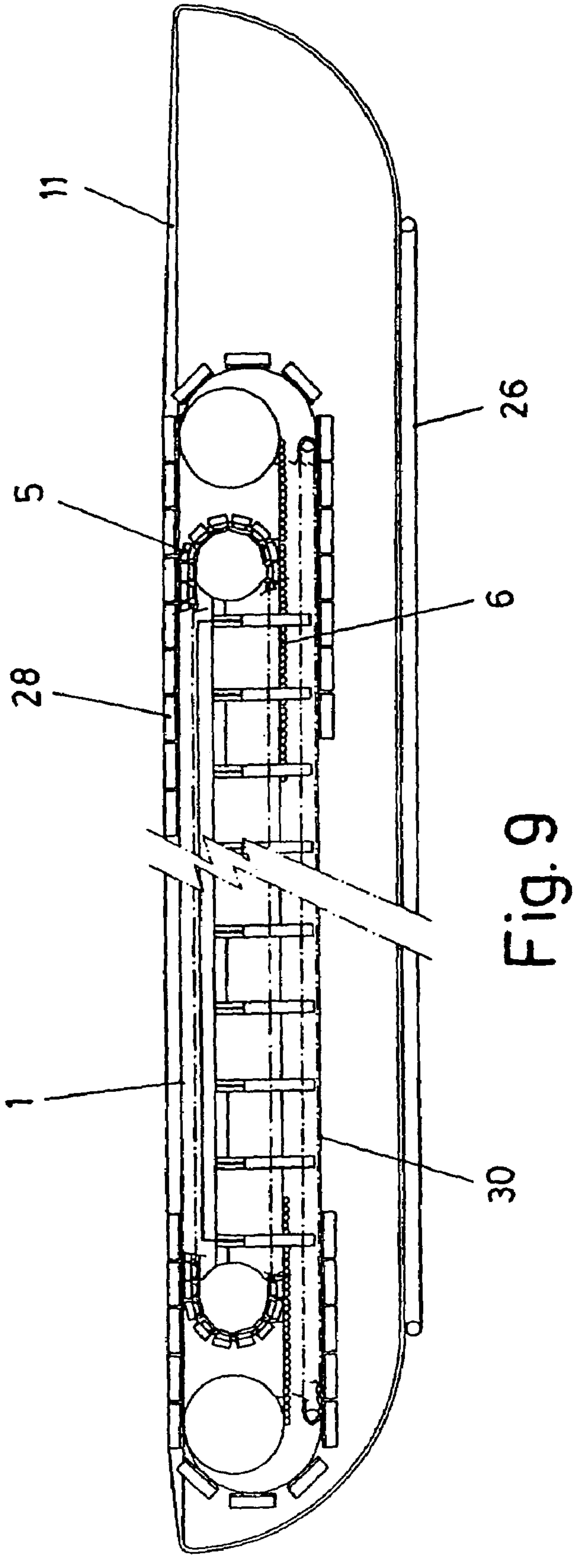
FIG. 9 shows a side view of the part corresponding to the formed shaping of the concrete parts in a realization by the installation with retention stops at the outside of the side shaping bands of the forms.
Figure 10:
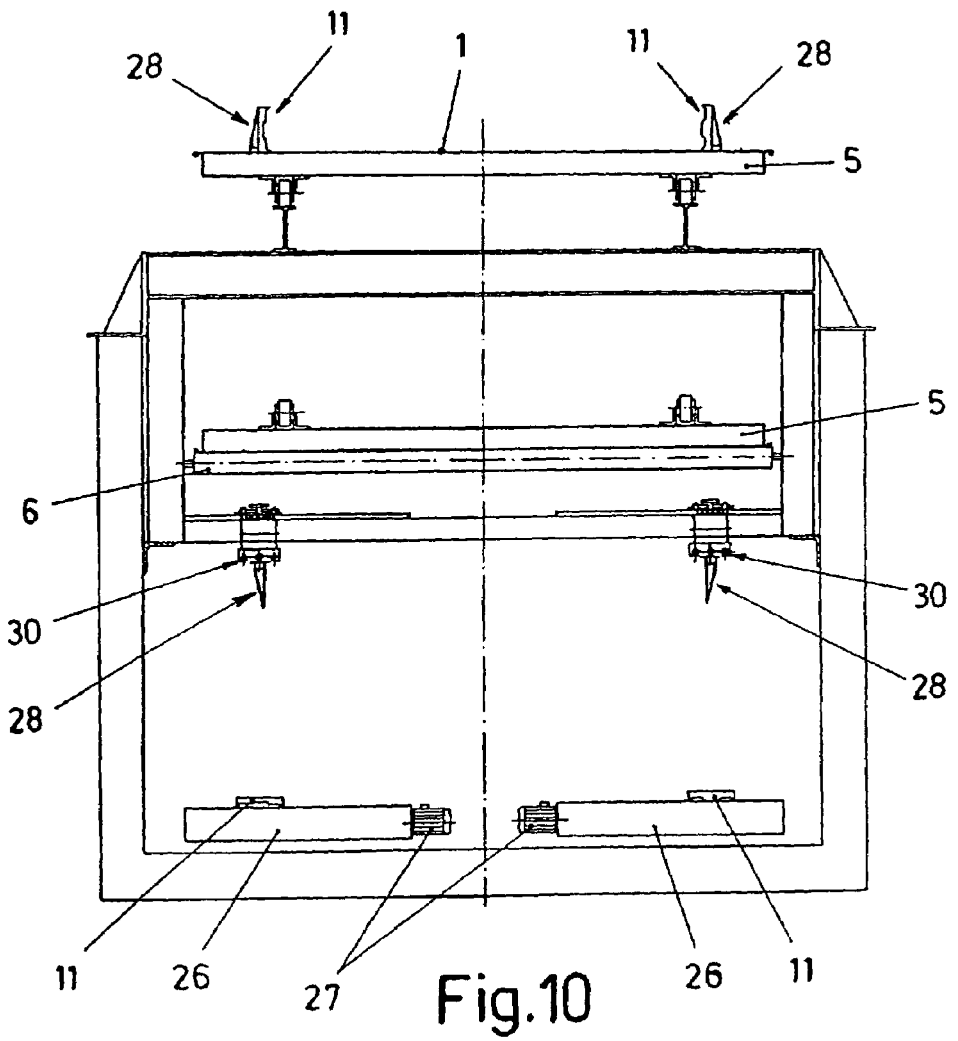
FIG. 10 is a transverse section view of the mentioned part of the installation represented on the previous figure.

According to a construction, as seen in FIGS. 9 and 10, the side bands (11) determine an upper path which extends above the belt (1), with return at the lower part in support on the respective supporting and hauling conveyor belts (26) which are activated by the corresponding engines (27).

In the return path on the lower part those bands (11) are lowered to a horizontal position in which they rest on the corresponding conveyor belts (26), favoring this way the movement hauling.

On the outer part of the side bands (11) some retention stops (28) are situated, by means of which the transverse position of the mentioned side bands (11) is assured on the belt (1), to avoid the relative movements that can give rise to the deformation of the formed parts.

Figure 20:
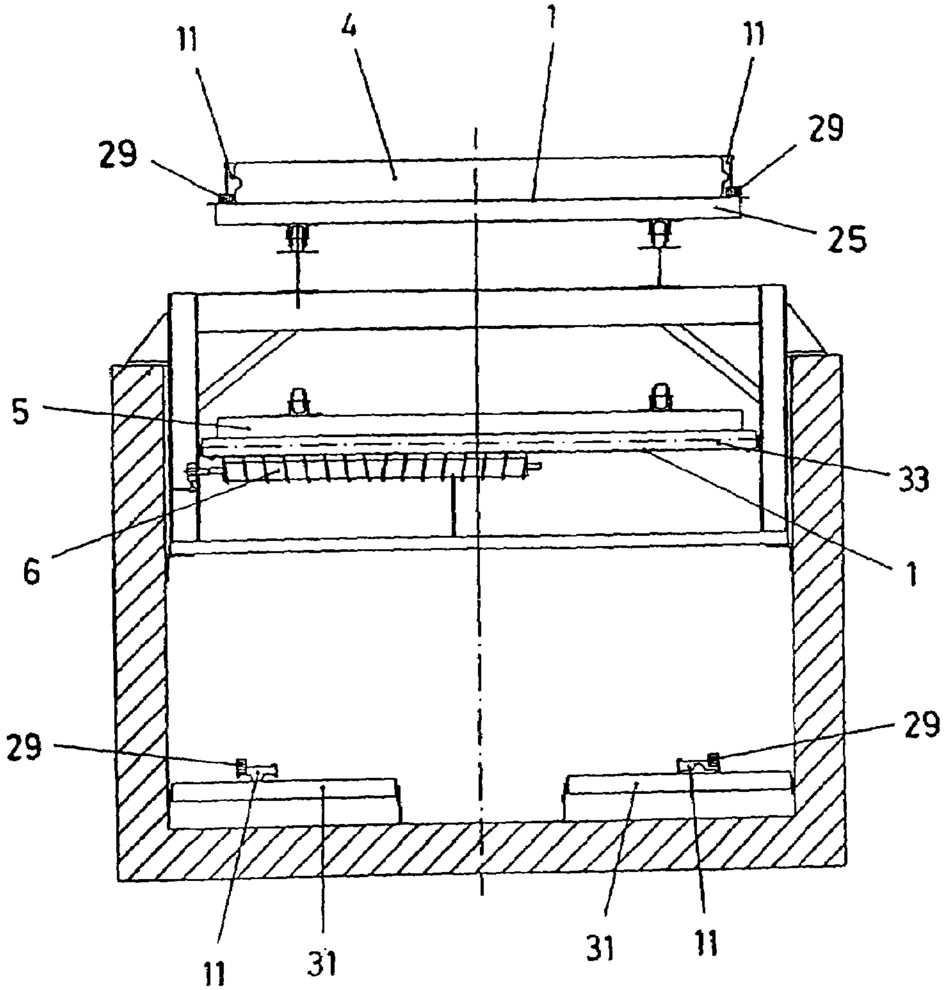
FIG. 20 is a transverse section view of the part forming conveyor area, in a return realization of the form shaping side bands together with the section stops on the metal band.

The abovementioned stops (28) are made up by both series of magnets (29), which are consecutively joined by means of springs, determining a succession in chain, according to a closed set, with a path at the upper part in support on the belt (1) and independent return along the lower part in support on the corresponding driving chains (30), as in FIGS. 9 and 10 or together with the respective bands (11), in support on the supporting rollers (31), as in FIG. 20.

Figure 11:
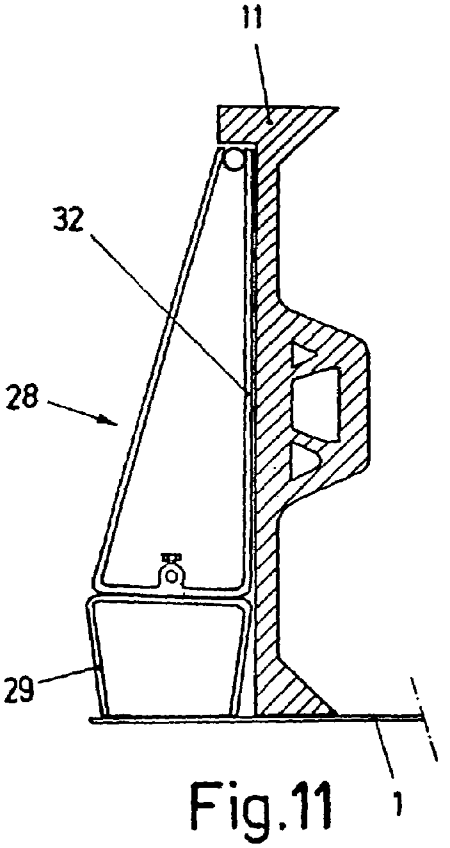
FIGS. 11 and 12 are both details in amplified transverse section of the disposition with outer stops of the side closing bands of the forms on the base metal conveyor band.
Figure 12:
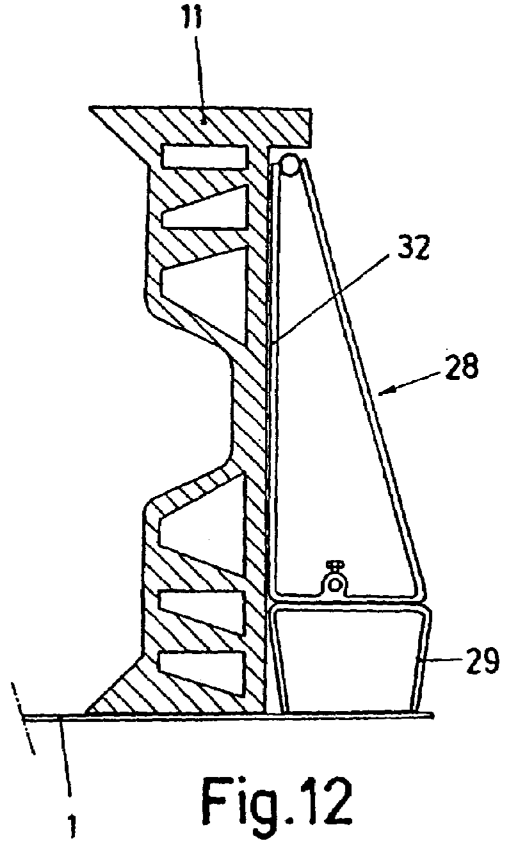

Over the magnets (29) some respective plates (32) are fixedly incorporated, as it is observed on FIGS. 11 and 12 by means of which a posterior retention support of the bands (11) is determined, impeding that these can move towards the outside on the belt (1).

By means of the magnets (29) the stops (28) are fixed in the path of the upper part on the metal belt (1), remaining this way synchronized with it in the movement, and in turn with the side bands (11), while the mentioned fastening establishes a sideways immobility which assures the retention of the bands (11) against the relative movement of the same on the belt (1) towards the outside.

In this disposition the metal belt (1) remains at its lower return part completely independent and free of loads, establishing respect to it, in that part, a guiding driver which corrects the side deviations of the same. The abovementioned guiding driver is established by means of some rollers in support on the side edges of the belt (1) and by means of an optic cursor, with laser or any other conventional means, following a straight line of reference, which determines an automatic correction of the transverse deviations, by means of pushing with the rollers in support on the sides.

In front of the concreting area of the parts (4) to be produced a marking pencil (12) is situated, which draws the separation of the consecutive parts (4) to be formed on the band belt (1) by means of a programmed control, as well as the window, door, etc . . . openings which have to remain defined on the corresponding parts (4), so that the workers in charge of it can place, respect to the mentioned drawings, separators (34) in the way of partitions to withhold the constructive concrete according to the drawn shape of the parts (4), in the form partition which is determined to the respect between the abovementioned separators (34) and the side bands (11).

With respect to the metal belt (1) an impregnator (13) with anti-setting lacquer and an impregnator (14) of stripping grease, which are selectively activated by programming according to the finish foreseen of the parts (4) to be carried out.

On the other hand, respect to the return part of the belt (1), surface cleaning means of the mentioned belt (1) are situated, to eliminate completely the residues that can remain on it from the concreting of the parts (4) carried out at the upper part, the abovementioned cleaning means comprising, for instance, some scrapers (15), a brush (16) and a polishing roller (17), without this list being limitative, as in the same way any other cleaning element can be situated.

Above the transport (1), after the conclusion of the side bands (11), further means (18) are included capable of actuating on the surface of the parts (4) being built, to polish the constructive concrete of the same.

Between the conveyor belt (1) and the following transport (2), a roller support (19) is included which is free or with traction, determining a transition passage for the transport of the parts (4) between the transports (1 and 2).

Above the second transport (2) a painting head (20) is situated, which allows, by means of a selective activation by means of programming, to colour the forming parts (4) when this is required.

The transition between the second transport (2) and the outlet transport (3) for the unloading of the parts (4), is by direct passage, situating under that transition a projector (21) of water under pressure, which in turn can be selectively activated through programming to clean the lower surface of the parts (4) when the completed finish of this requires so.

Figure 16:
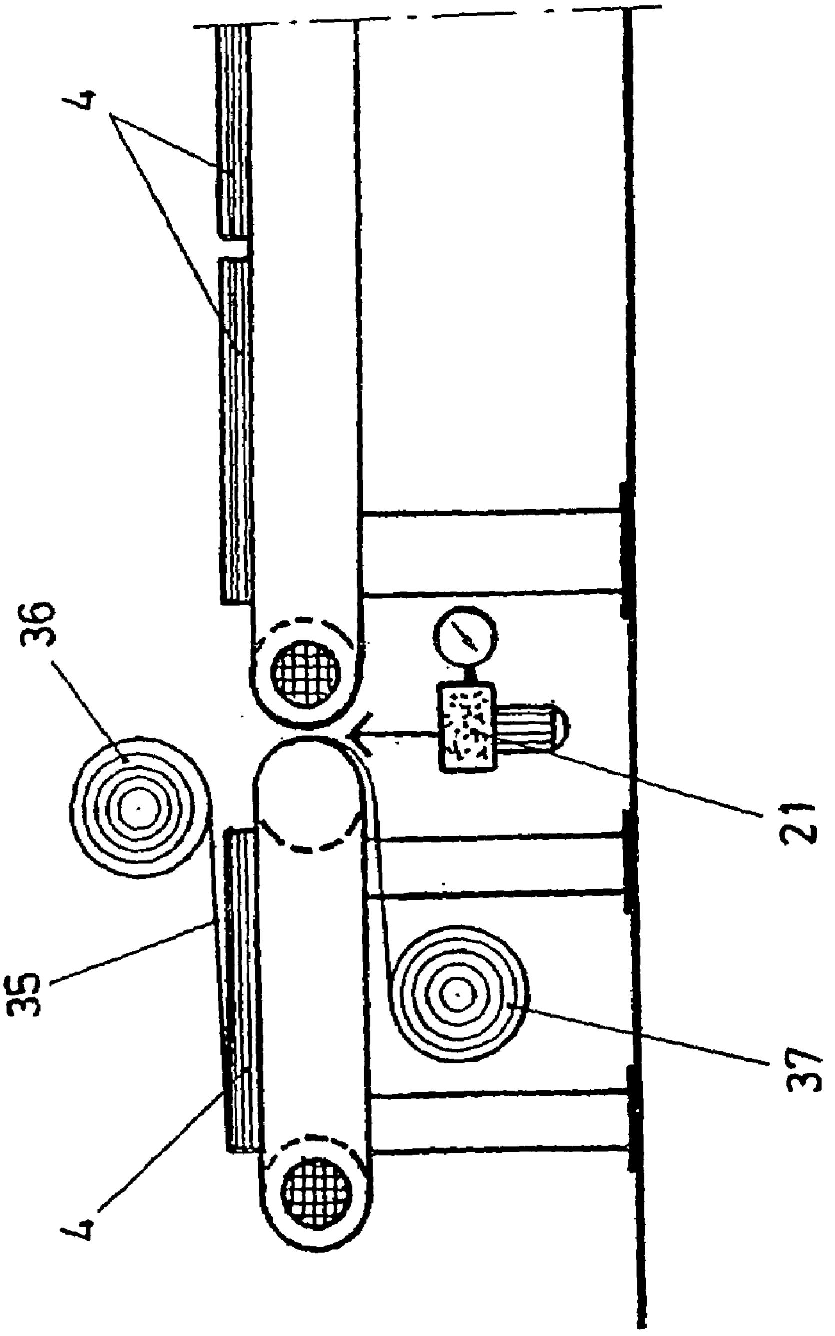
FIG. 16 is a side view of the passage of the parts from the drying conveyor to the outlet area with incorporation of the delivery of a thermoretractile plastic laminar band to wrap up the parts.

In the passage area from the conveyor (2) for the drying to the unloading outlet (3), a delivery of thermoretractile plastic laminate band (35) is situated from an upper coil (36) and a lower coil (37), in the way shown in FIG. 16, remaining the laminate band (35) transverse respect to the movement path of the parts (4), when the mentioned parts (4) pass towards the unloading outlet (3) they remain wrapped up by the abovementioned laminar band (35). With the abovementioned wrapping some conditions which favour the total setting of the part (4) concreting are reached, in little time during the storage of the same.

Figure 7:
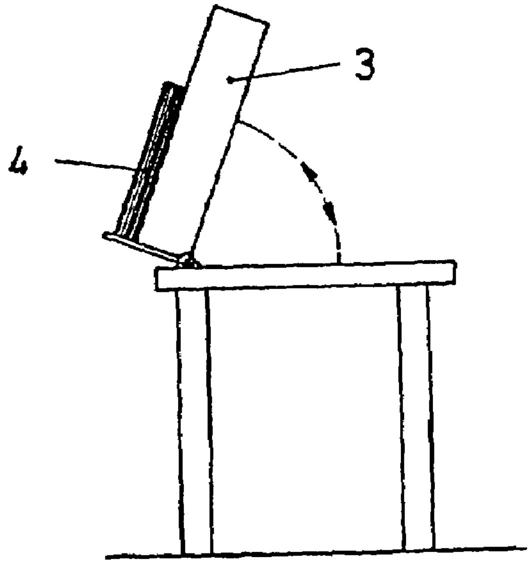
FIG. 7 is a front view of a detail of the outlet conveyor of the produced parts, in the inclined position to collect the part that is situated on the mentioned conveyor.

The outlet transport (3) makes up an outlet support of the parts (4), in disposition of an assembly in sideways tilting, with inclination possibility, until an almost vertical position (about 80°), in the way represented on FIG. 7, to collect the parts (4) by means of lifting with a crane, fastened at the side, avoiding transverse supporting efforts.

Figure 2:
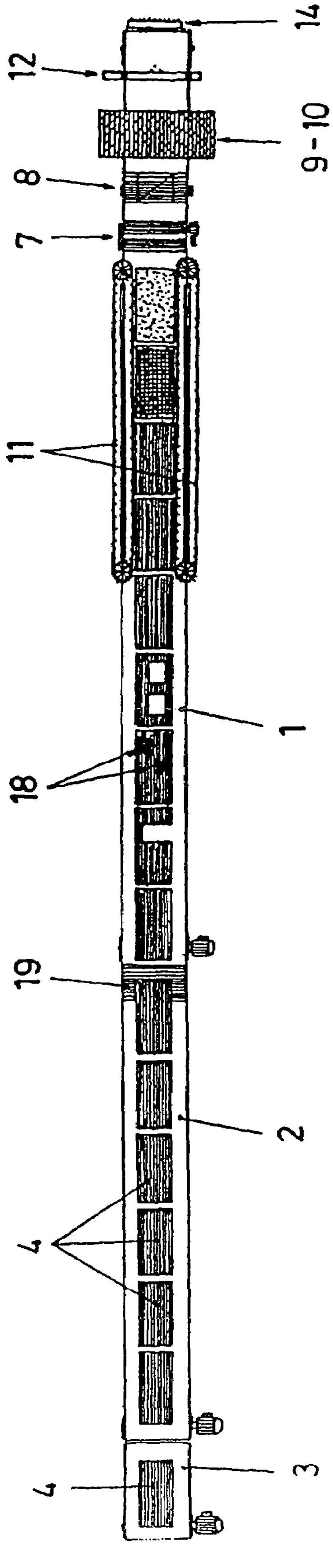
FIG. 2 is a top view of the schematic installation set.
Figure 3:
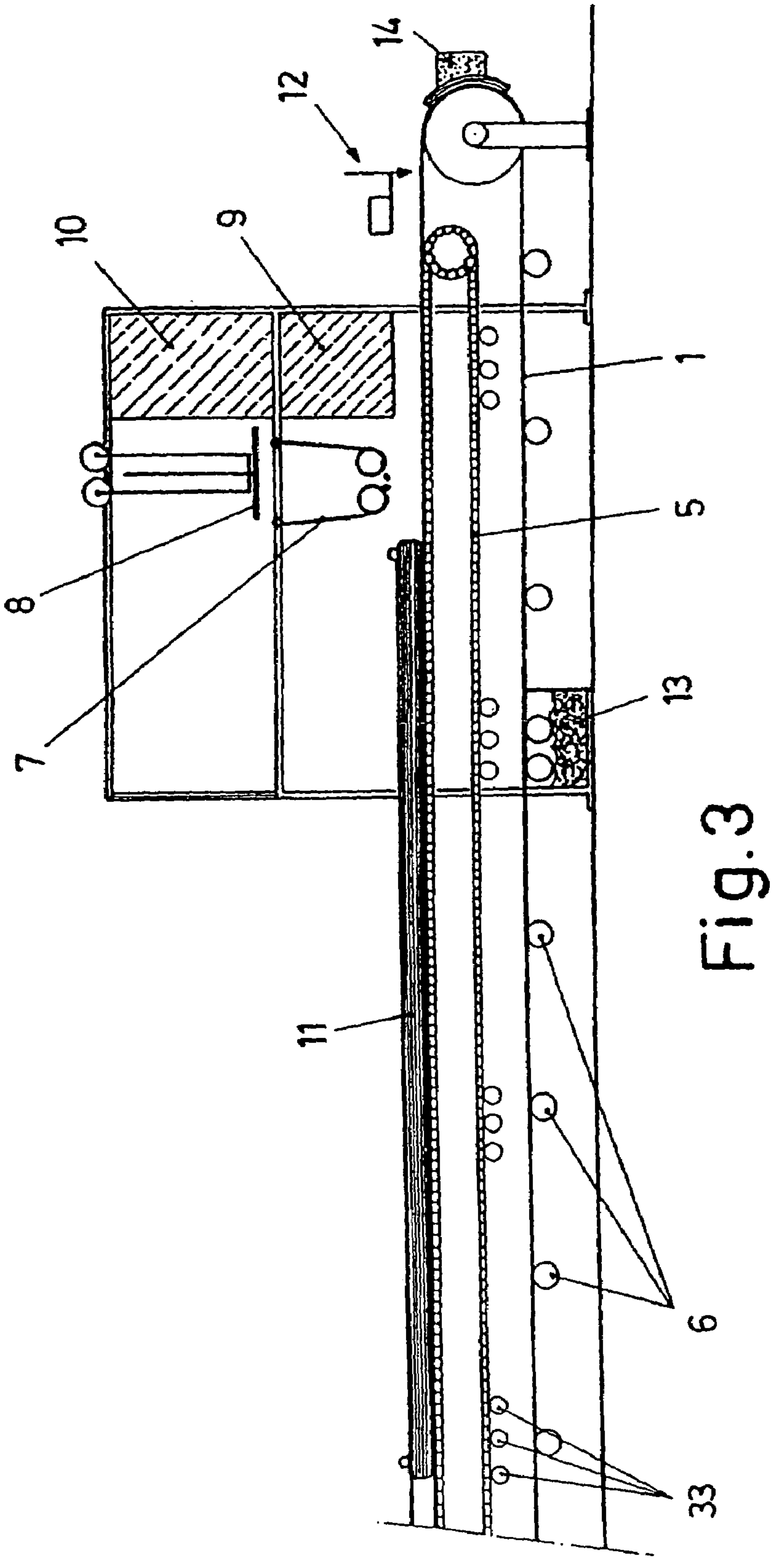
FIG. 3 is an enlarged representation, according to the lifting of FIG. 1, of the first half of the installation.
Figure 4:
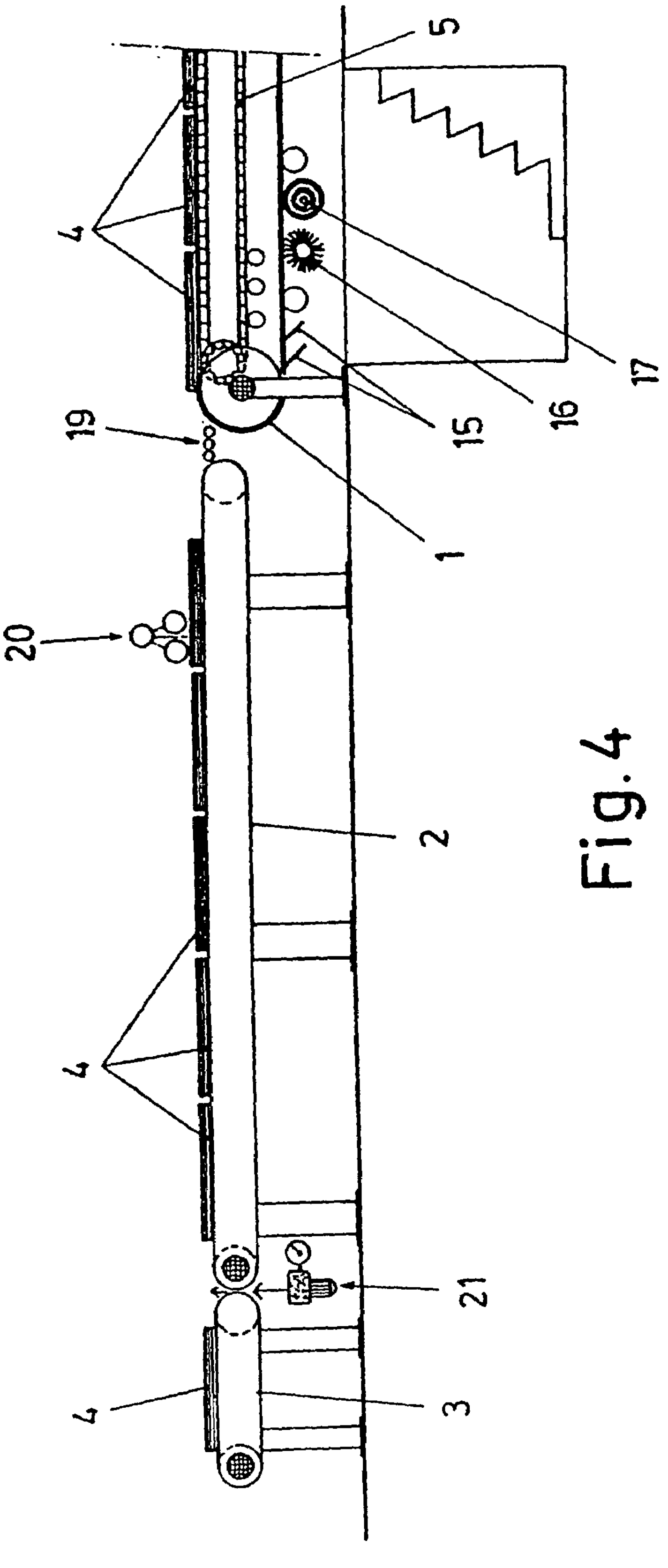
FIG. 4 is an enlarged representation, according to the lifting of FIG. 1, of the second half of the installation.
Figure 5:
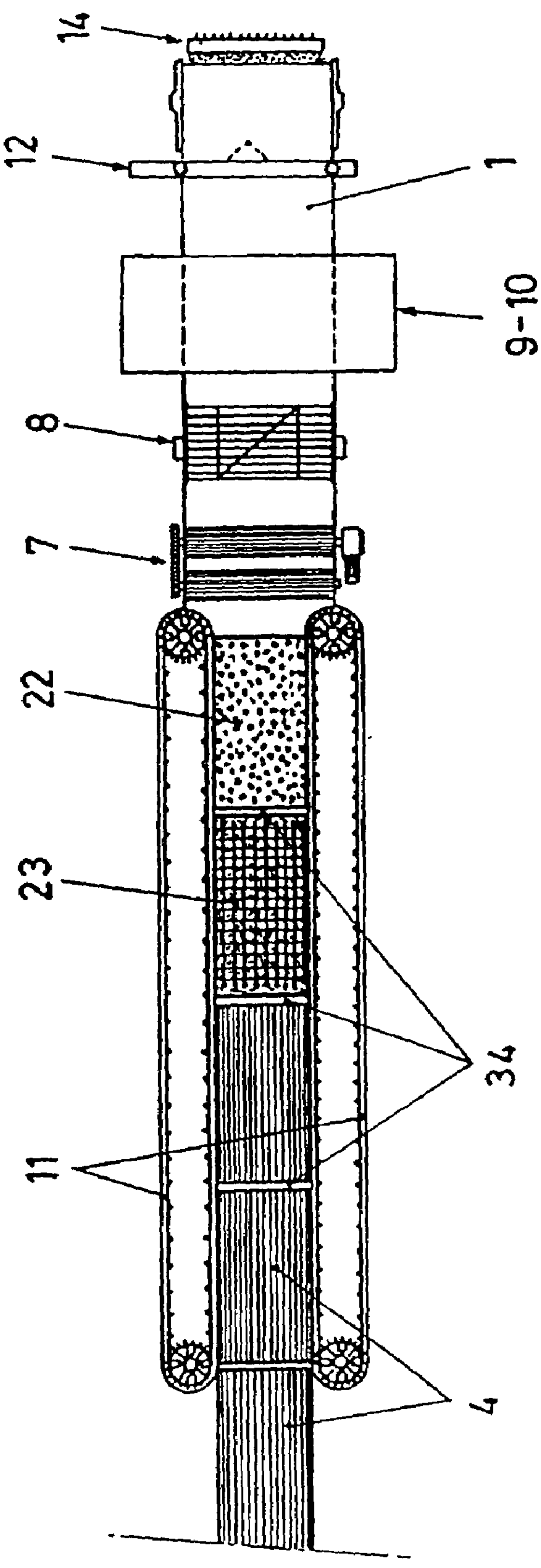
FIG. 5 is an enlarged representation, according to the top view of FIG. 2, of the first half of the installation.
Figure 15:
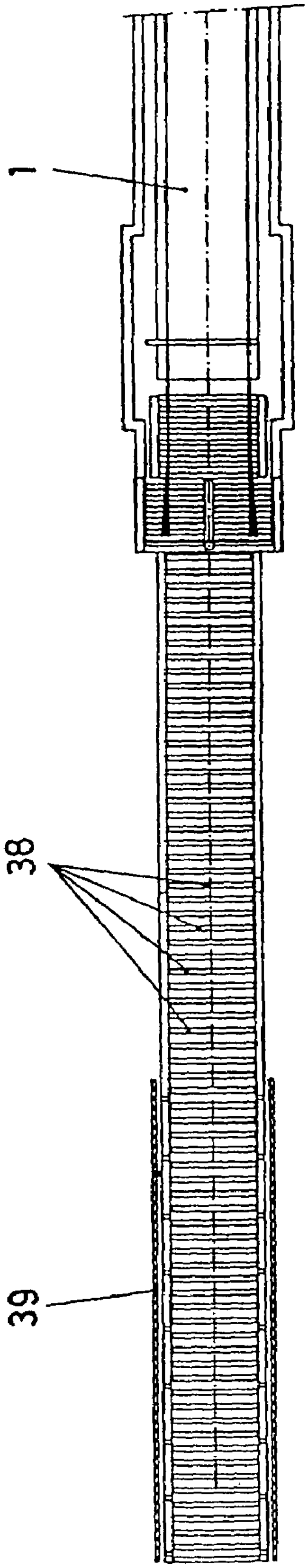
FIG. 15 is a top view of the drying conveyor of the parts and the outlet area for the unloading in a realization with rollers.

The transport (2) of the installation, destined to the drying of the concrete parts (4), as well as the outlet (3) transport for the unloading, can be shaped with conveyor belts of structured synthetic material on bearing chains, as in FIGS. 1, 2 and 4 but a peculiar realization shape is foreseen, in the way represented on FIG. 15, by means of a succession of rollers (38), determining a rotating transport, on which the parts (4) are supported in their movement towards the unloading area (3), therefore some of the rollers (38) are foreseen with driven activation, while the others are in free rotating assembly; being the driving rollers the ones which carry out the hauling of the parts (4) for their movement while the others are only rotating supports.

Figure 19:
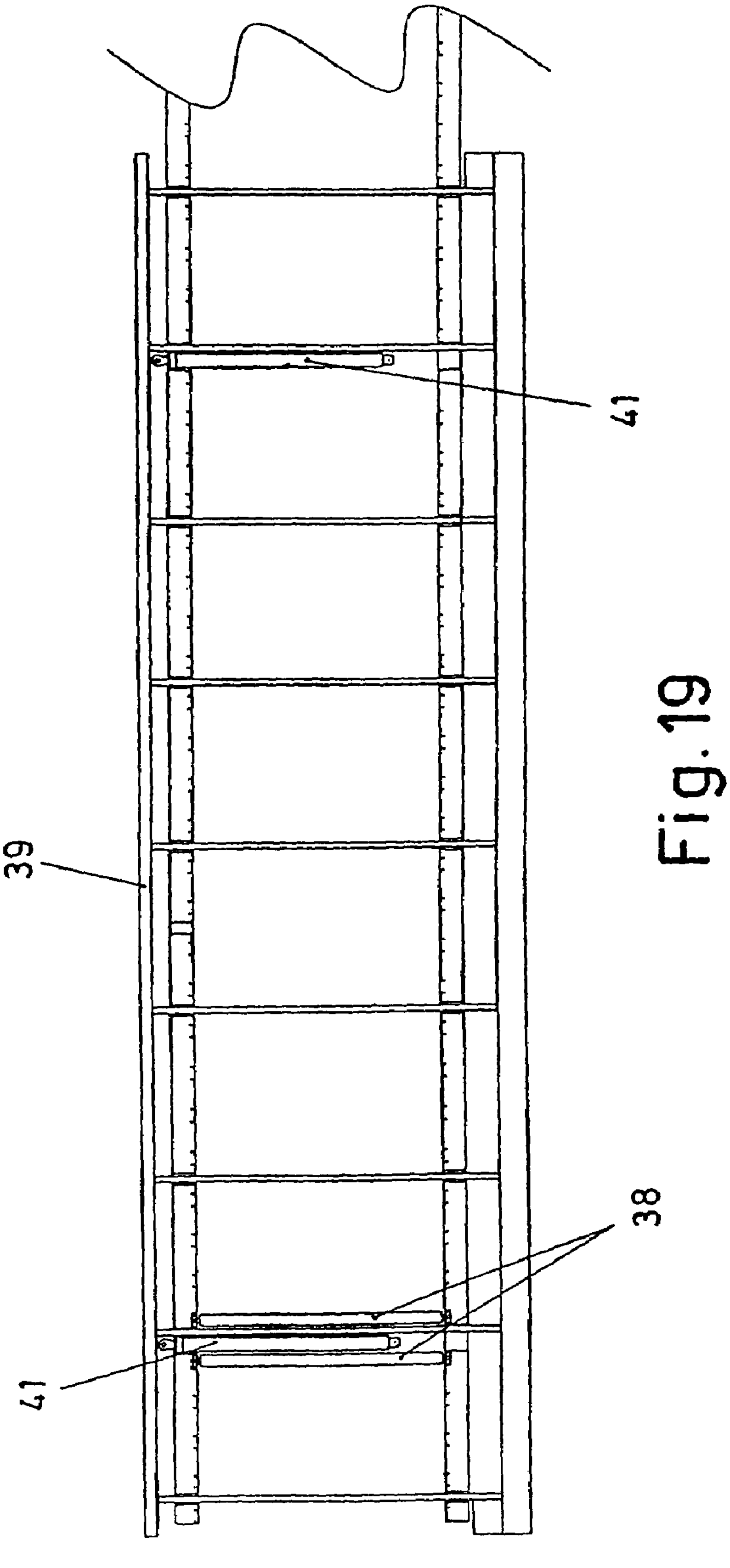
FIG. 19 is a top view of the mentioned unloading outlet area according to the previous realization.

The abovementioned construction allows to place a frame (39) at the outlet (3) for the unloading, the structure of said frame remains interposed between the rollers (38) in support of the movement of the parts (4) without interfering with the mentioned rollers (38), as shown on FIG. 19, where only two rollers (38) have been represented, but it is perfectly observed that the transverse bars of the frame structure (39) remain interposed between the positions of the set of rollers (38) which will be situated in that part of the installation.

Figure 18:
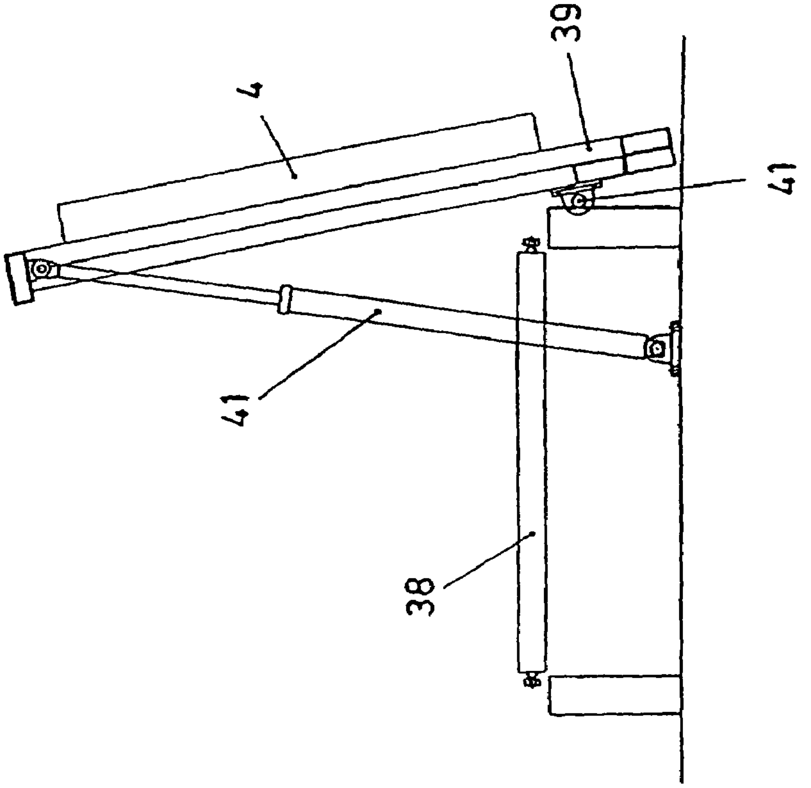
FIGS. 17 and 18 are both positions, in front view, of the outlet area for the unloading, with incorporation of a lifting frame of the parts, respectively in the transport position and in the collection position of the parts.
Figure 17:
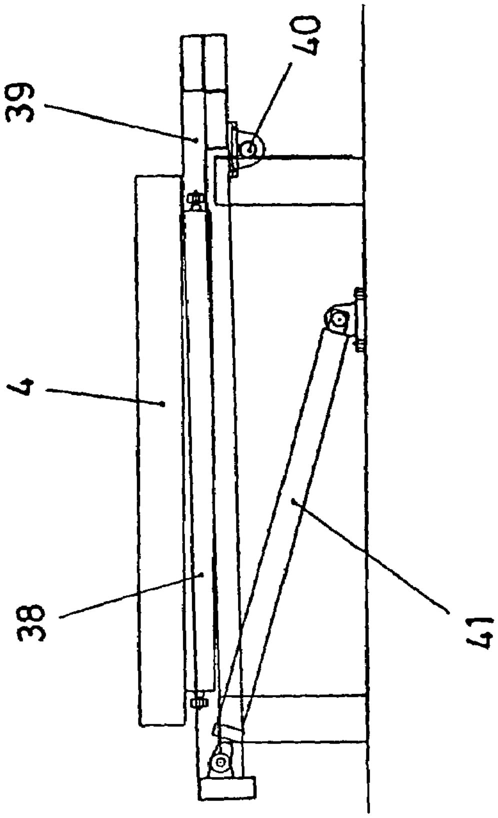

As it is observed on FIGS. 17 and 18, the frame (39) is situated in an articulated way respect to a rotary fastening (40) at one of the sides, having some activating cylinders (41) which allow to activate a tilting of the mentioned frame (39) between a horizontal position, as the one of FIG. 17 and an almost vertical position, as the one of FIG. 18.

In the horizontal position (FIG. 17) the frame (39) remains recessed respect to the upper plane of the rollers (38), so that the concrete parts (4) are supported on the mentioned rollers and can be moved on the same without any inconvenience to reach the unloading position.

When the parts (4) reach the unloading position, the cylinders (41) actuate, lifting in tilting operation the frame (39), which also lifts the part (4) with it which is in that area (FIG. 18), placing the part (4) this way in an almost vertical position, to withdraw the same by fixing it at a side with some lifting means such as a crane, reaching the mentioned positioning of the part (4) without the movement of the conveyor rollers (38) away from their position.

The operation control of the installation is established in an automatic way by a programmable information control, in the way that once introduced the corresponding programme at the control centre, when the installation is activated the belt (1) is started, its movement is transmitted mechanically to the side bands (11).

At the same time the marking pencil (12) starts to actuate, executing the drawing of the successive parts (4) to be carried out, on the belt surface (1).

According to the finishing programme of the parts (4), the impregnator with anti-setting lacquer (13) or the impregnator with stripping grease (14) is activated, so that if the finishing of the parts (4) is foreseen with an uncovered concrete surface, the impregnator (14) with stripping grease starts to operate, so that the concrete forming the parts (4) does not adhere to the belt surface (1) and is easily freed.

When the finish of the parts (4) is foreseen with an aggregate uncovered surface, on the contrary the impregnator (13) of an anti-setting lacquer, which deposits a layer of lacquer on the surface of the belt (1), which makes that in touch with the constructive concrete of the parts (4), the mentioned concrete will not harden in a fine layer (of 1 or 2 millimeter), with which by means of a cleaning during the final stage the cementing material (cement) of the concrete can be eliminated so that the uncovered surface remains in the shape of aggregate.

With respect to the drawing carried out with the marking pencil (12), one or more workers place the separating devices (34) to individualize the parts (4) to be formed, as well as the necessary isolation separators for the window, door, etc . . . openings, foreseen in the parts (4), foreseen with such opening, so that between the mentioned separators and the side bands (11), they determine the moulding cavities to build the parts (4) to be carried out.

By means of the unloading head (7) afterwards an amount of concrete is placed in said part moulding cavities, after which the discharging head (7) is withdrawn, actuating then the head (8) which flattens and compacts the concrete in the corresponding cavity, being the mentioned head (8) withdrawn afterwards.

The concrete layer (22) which is initially situated this way in the moulding cavities to build the parts (4), is only a partial thickness respect to the thickness of the parts (4) to be carried out, situating hereafter on the mentioned partial concrete layer (22) the reinforcing structure (23) to rigidify the parts (4), which is carried out by means of an accessory crane.

Once placed the reinforcing structure (23) the discharging head (7) intervenes again, which moves till the corresponding forming cage and places in it a calculated amount of concrete to fill the cavity completely.

Afterwards the discharging head (7) is withdrawn again, the head (8) then intervenes, and moves till the cavity of the part (4) being formed, flattening and compacting the placed concrete after which said head (8) is also withdrawn.

The cavity full of flattened and compacted concrete is carried by means of the conveyor belt (1) between the bands (11), for a time during which the concrete remains set, although not dry, so that at the end of the path on the belt (1) the separating devices can be withdrawn, remaining the parts (4) independent.

During the transport on the belt (1), the means actuate, if it is programmed this way, to polish the concrete surface which is still fresh.

At the end of the belt (1) the independent parts (4) pass on to the transport (2), on which a time is completed during which the drying of the constructive concrete of the parts (4) is finished until acquiring enough hardness to manipulate the same.

If foreseen in the programming, on that transport (2) the painting head (20) can be activated, to colour the parts (4) being formed, as provided.

From the transport (2), the parts (4) go on to the outlet (3), so that if the finish of the parts (4) is programmed for an uncovered surface of aggregate, the activation of the water projector (21) occurs, cleaning the surface of the parts (4) during the mentioned passage of the same from the transport (2) onto the outlet (3).

The parts (4) are received at the outlet (3), which allows by means of the sideways tilting until an almost vertical position to extract the parts (4) by means of a crane in a disposition which avoids the transverse efforts on them.

Figure 8:
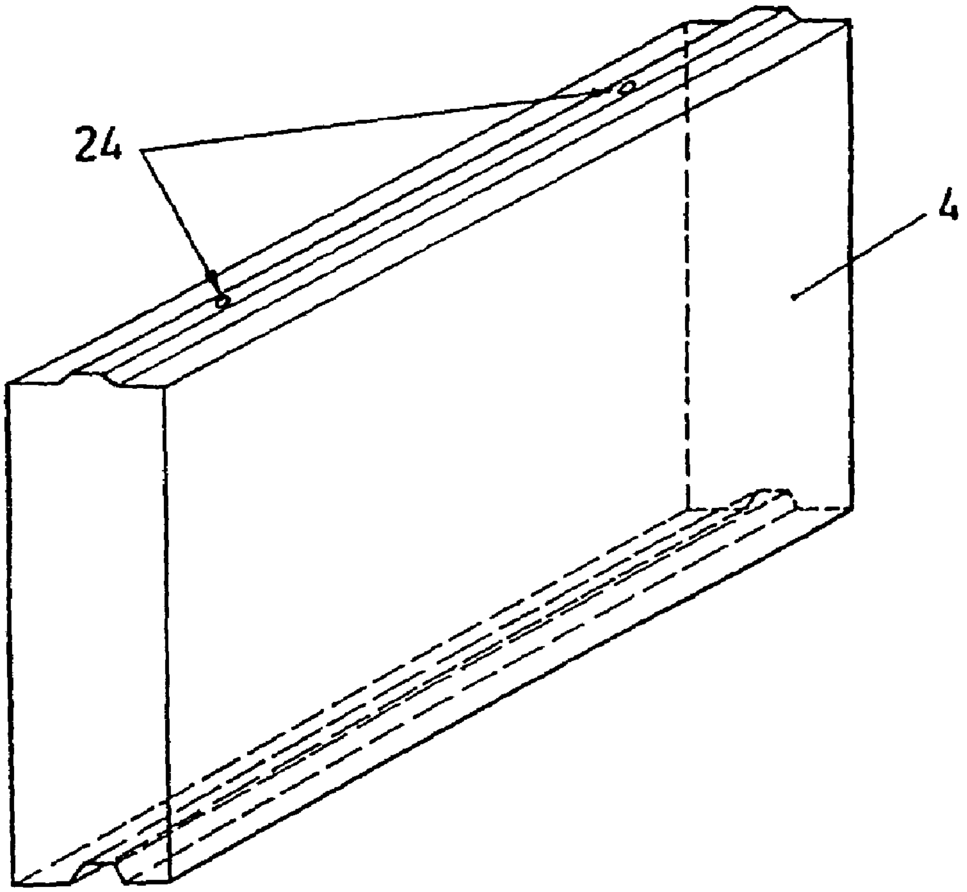
FIG. 8 is an example in perspective of a part that can be carried out by means of the installation.

The realizable parts (4) can be of any kind which allows a conformation of the formed concreting; representing FIG. 8 a non limitative example of a possible part (4) in the shape of a plate, with profiled side edges in counter-position and with holes (24) for the fixing of the fastening eyebolts for the handling hooking.

Figure 6:
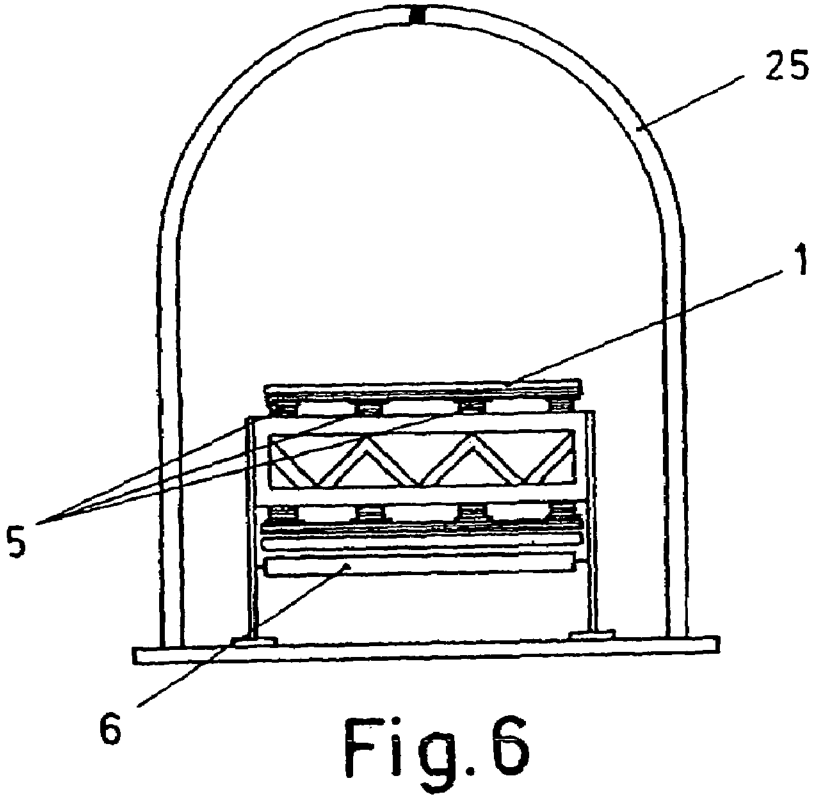
FIG. 6 is a schematic transverse section of the installation with the covering arch.

The set of the installation is foreseen with a covering by means of an arch (25), according to FIG. 6, determining a closed area in which it is susceptible of creating an environment of temperature and humidity, also by means of programming, to optimize the setting conditions and drying of the constructive concrete of the parts (4) in combination with the movement speed of the same along the installation.

In the installation, moreover, a recirculation of the residual cleaning water of the parts (4) is foreseen, as well as of the residual water of the head cleaning (7 and 8) in the cabins (9 and 10), to send the mentioned residual water to the concrete elaboration process, necessary to build the parts (4), with which the consumption of water in the installation is reduced, eliminating in turn the pouring out of polluted residual water, as the residual cleaning water is used to elaborate the concrete for the part (4) formation to be carried out.

The invention claimed is:

1. An apparatus for producing reinforced concrete parts, comprising:

i. a conveyor belt (1) serving as means for transporting a plurality of moulds for forming said concrete parts (4), ii. heads (7 and 8) to discharge and adapt the constructive concrete into the moulds, iii. a transport conveyor (2) located after the conveyor belt (1) for drying said concrete parts (4), iv. an unloading conveyor (3) for the withdrawal by means of lifting of the formed concrete parts (4), v. a marking pencil (12), vi. a plurality of isolation separators, and vii. continuous side bands (11) situated on the conveyor belt (1) and moving in corresponding motion with the conveyor belt (1), wherein the conveyor belt (1) is a metal sheet, on which said marking pencil (12) draws a separation line on the conveyor belt for the placing of isolation separators which defines a moulding cavity for the forming of said concrete parts (4).

2. An apparatus for producing reinforced concrete parts according to claim 1, wherein the conveyor belt (1), at its upper part, is supported by chains (5) which determine a continuous support accompanying the conveyor belt (1), while at the lower part, the conveyor belt (1) returns completely independent, supported on a succession of supporting rollers (6,33).

3. An apparatus for producing reinforced concrete parts according to claim 1, further comprising a first impregnator (13) for anti-setting lacquer and a second impregnator (14) for stripping grease, which are activated selectively according to a finish foreseen for the parts (4) to be carried out.

4. An apparatus for producing reinforced concrete parts according to claim 1, wherein the lower returning part of the conveyor belt (1) further comprises cleaning means (15, 16, 17) situated for eliminating the remains of the forming concrete of the parts (4) on said conveyor belt (1).

5. An apparatus for producing reinforced concrete parts according to claim 1, further comprising an arch (25), determining an enclosed space for creating an atmosphere with programmed temperature and humidity to optimize the setting and drying conditions of the constructive concrete of the parts (4) during the production process.

6. An apparatus for producing reinforced concrete parts according to claim 1, further comprising:

stops (28) of the side bands (11) situated on the conveyor belt (1), on the outside of the side bands (11), said stops (28) being made up by a series of magnets (29) joined in chain, forming a closed succession with an upper path in support on said conveyor belt (1) and an independent return at the lower part, respective plates (32), on which the side bands (11) are supported, the plates being fixedly incorporated on the magnets (29).

7. An apparatus for producing reinforced concrete parts according to claim 1, wherein the side bands (11) are vertically supported on the side on the conveyor belt (1) at the upper part, returning lowered in horizontal position at the lower part supported on some corresponding belts (26) or rollers (31).

8. An apparatus for producing reinforced concrete parts according to claim 1, wherein the heads (7 and 8) to provide and adapt the concrete in the moulds of the parts (4) are of a smaller width than the conveyor belt (1), being incorporated in a transverse movement with respect to the conveyor belt (1) in movement disposition until said heads (7 and 8) reach cleaning cabins (9 and 10) which are situated at a side.

9. An apparatus for producing reinforced concrete parts according to claim 1, further comprising:

with respect to the lower returning part of the conveyor belt (1), a guiding driver which corrects the transverse deviations, by means of supports on the side edges of said conveyor belt (1) and means for defining a straight line of reference.

10. An apparatus for producing reinforced concrete parts according to claim 1, wherein said transport conveyor (2) and said unloading conveyor (3) to withdraw the parts (4) are determined by means of a succession of rollers (38) on which the parts (4) in motion are supported, a desired number of said rollers (38) being provided with motorized activation means for activating the motion.

11. An apparatus for producing reinforced concrete parts according to claim 10, wherein a frame (39) is situated at the unloading conveyor (3) to withdraw the parts (4), a structure of said frame (39) remaining interposed with respect to the rollers (38), said frame (39) comprising articulation means (40) for sideways tilting of said frame (39), and means (41) for activating said tilting, allowing the lifting of the parts (4) toward a vertical position, independent from the supporting rollers (38).

12. An apparatus for producing reinforced concrete parts according to claim 1, wherein a thermoretractile plastic laminate band delivery device (35) is incorporated in between the transport conveyor (2) and the unloading conveyor (3), in transverse disposition with respect to the movement path of the parts (4) to wrap up the formed parts (4) when said parts (4) pass toward the unloading conveyor (3).

13. An apparatus for producing reinforced concrete parts according to claim 4, wherein the incorporated cleaning means (15,16,17) comprises a residual water recirculation system for reducing a consumption of water used during the production process.

* * * * *